United States Patent
Kesel

(10) Patent No.: US 6,574,614 B1
(45) Date of Patent: Jun. 3, 2003

(54) CONSUMER FEEDBACK APPARATUS

(76) Inventor: Brad Kesel, 1953 Briarmill Rd., Atlanta, GA (US) 30329

( * ) Notice: Subject to any disclaimer, the term of this patent is extended or adjusted under 35 U.S.C. 154(b) by 0 days.

(21) Appl. No.: 09/498,153

(22) Filed: Feb. 4, 2000

Related U.S. Application Data

(63) Continuation of application No. 09/167,830, filed on Oct. 7, 1998, now Pat. No. 6,026,387, which is a continuation of application No. 08/683,612, filed on Jul. 15, 1996, now Pat. No. 5,822,744.

(51) Int. Cl.⁷ .............................................. G06N 5/02
(52) U.S. Cl. ............................. 706/52; 705/10; 705/8
(58) Field of Search .......................... 706/52; 705/10, 705/8, 4, 40; 455/2; 700/232

(56) References Cited

U.S. PATENT DOCUMENTS

| | | | |
|---|---|---|---|
| 3,995,254 A | 11/1976 | Rosenbaum | 382/231 |
| 4,093,821 A | 6/1978 | Williamson | 704/207 |
| 4,345,315 A | 8/1982 | Cadotte et al. | 705/10 |
| 5,041,972 A | 8/1991 | Frost | 364/401 |
| 5,077,785 A | 12/1991 | Monson | 379/67 |
| 5,179,624 A | 1/1993 | Amano et al. | 704/232 |
| 5,278,751 A | 1/1994 | Adiano et al. | 364/402 |
| 5,294,781 A | 3/1994 | Takahahi et al. | 235/376 |
| 5,305,196 A | 4/1994 | Deaton et al. | 364/401 |
| 5,315,093 A | 5/1994 | Stewart | 235/381 |
| 5,331,544 A | 7/1994 | Lu et al. | 364/401 |
| 5,384,894 A | 1/1995 | Vassiliadis et al. | 395/61 |
| 5,401,946 A | 3/1995 | Weinblatt | 235/381 |
| 5,444,820 A | 8/1995 | Tzes et al. | 395/22 |
| 5,537,618 A | 7/1996 | Boulton et al. | 345/326 |
| 5,550,746 A * | 8/1996 | Jacobs | |
| 5,623,581 A * | 4/1997 | Attenberg | |
| 5,636,285 A | 6/1997 | Sauer | 381/68.2 |
| 5,644,727 A * | 7/1997 | Atkins | |
| 5,758,257 A | 5/1998 | Herz et al. | 455/2 |
| 5,822,744 A * | 10/1998 | Kesel | 706/52 |
| 5,845,256 A * | 12/1998 | Pescitelli et al. | |
| 5,875,110 A * | 2/1999 | Jacobs | |
| 5,875,437 A * | 2/1999 | Atkins | |
| 5,913,019 A * | 6/1999 | Attenberg | |
| 5,953,707 A * | 9/1999 | Huang et al. | 705/10 |
| 6,026,387 A * | 2/2000 | Kesel | 706/52 |
| 6,151,582 A * | 11/2000 | Huang et al. | 705/8 |

OTHER PUBLICATIONS

GuesTrak! Brochure, automated comment card and Guest Services Hotline, Impac Hotel Group (undated).
Customer satisfaction questionnaire form, Impac Hotel Group (undated).
Amano et al. On The Use of Neural Networks and Fuzzy Logic in Speech Recognition, IEEE 1986, 1301–1305.

* cited by examiner

Primary Examiner—Wilbert L. Starks, Jr.
(74) Attorney, Agent, or Firm—Baker, Donelson, Bearman & Caldwell

(57) ABSTRACT

A consumer feedback apparatus for collecting, analyzing, and reporting information on goods and services offered for sale to consumers by providers, comprising a recording station selectively operable by consumers for recording oral comments regarding goods and services offered by the providers. The oral comments and associated time signals are communicated to an analyzer for creating discrete normalized representations including comment category, at least one descriptor, at least one dimension, and an attitude, representative of each oral comment. Normalized comments are then selected according to the comment category, descriptor, dimension, attitude, and time signal, and analyzed for reporting to the provider for use in responding to perceptions of consumers as to the services and goods offered by the store to consumers. A method of collecting, analyzing, and reporting consumer feedback comments on goods and services offered for sale to consumers by retailers is disclosed.

22 Claims, 5 Drawing Sheets

Report for ACME Department Stores

Period 5/1-5/8
Store # 23

| Ref # | Product Description | S-Descr.1 | S-Descr.2 | Service Pos. | Neg. | Physical Pos. | Neg. | Policy Dimension | Pos. | Neg. | Mgt. Pos. | Neg. | Overall Pos. | Neg. | Other Attitude | # of Comments |
|---|---|---|---|---|---|---|---|---|---|---|---|---|---|---|---|---|
| Totals | | | | 7 | 12 | 14 | 20 | 2 | 8 | 1 | 0 | 1 | 5 | 6 | 3 | 1 |
| 1 | Jewelry | Watches | Seikoni | | | | | Brand Image | | | S-Dim.1 color | | S-Dim.2 black | | poor | 5 |
| 2 | Lighting | lamps | halogen | | | | | Availability | | | | | | | inadequate | 4 |
| 3 | Housewares | Cookware | Revereware | | | | | Price | | | | | | | excessive | 3 |
| 4 | Furniture | Chairs | Recliners | | | | | Price | | | discount | | | | excellent | 7 |
| 5 | Cosmetics | Este Lauder | Bethany | | | | | Informative | | | S-Dim.1 | | S-Dim.2 | | poor | 12 |
| 6 | Men's Suits | James | | | | | | Helpful | | | | | | | excellent | 14 |
| 7 | Bridal | China | | | | | | Available | | | | | | | poor | 8 |
| 8 | Luggage | Large | | | | | | Neatness | | | S-Dim.1 Aisles | | S-Dim.2 | | poor | 2 |
| 9 | Electronics | TV | | | | | | Well Lit | | | Displays | | | | good | 2 |
| 10 | Bath | Women's | 2nd Flr | | | | | Clean | | | toilets | | | | poor | 6 |

Examples of raw comments

Ref. 1 Who ever heard of Seikoni watches?
If I knew anything about Seikoni, I might trust it's reliability
I wouldn't buy Seikoni because I've never seen it advertised Ref. 7 Where are the porcelain salespeople when you need them??
You need to get more staff in the china area
I'm appalled at the lack of help in the china department

FIG. 5

CONSUMER FEEDBACK APPARATUS

This is a continuation of application Ser. No. 09/167,830, filed Oct. 7, 1998, now U.S. Pat. No. 6,026,387, which is a continuation of Ser. No. 08/683,612, filed Jul. 15, 1996, now U.S. Pat. No. 5,822,744.

TECHNICAL FIELD

The present invention relates to apparatus or communicating comments by consumers to providers of goods and services. More particularly, the present invention relates to an apparatus and method that collects, analyzes, and reports consumer comments for responding to consumer perceptions about the goods and services offered by providers.

BACKGROUND OF THE INVENTION

Monitoring of consumer satisfaction and perceptions about goods and services provided by retailers is becoming increasingly important. The importance of such information arises from the competitive nature of retail delivery of high quality products and services. Consumer expectations generate demand for high quality in the products and services being delivered. Companies which provide high quality products and services to customers readily measure their success by increased profitability. Studies have reported that excellent customer service adds as much as twelve percent to profit margins. Repeated failures at customer service, or worse, consumer perceptions of failures to deliver quality customer service and goods can lead to mediocre economic performance and to possible failure of the provider as a business entity. Recognition of the importance of customer service has led a number of providers of goods and services to emphasize commitments to customer service in their advertising and promotional materials distributed to consumers. To consumer-oriented organizations, the loss of even one customer is significant. Researchers have found that it costs up to five times as much to acquire a new customer as it does to keep an existing one. A 5% increase in customer retention can lead to as much as a 30% improvement in earnings. Other studies have shown that only 4% of dissatisfied customers complain; the significant majority merely leave the store, and of these 91% of the dissatisfied do not return. In order to avoid losing a customer or a potential customer, providers recognize they must acquire and respond to feedback of consumers regarding satisfaction and perceptions of the products and services delivered by the provider.

The failure to obtain consumer feedback and to respond can be a problem having an unknown scale for a provider. For example, an unhappy customer is particularly more likely to complain about a "bad" experience than is a consumer likely to talk to friends and acquaintances about a "good" experience. It is estimated that a single bad experience with a provider can be communicated up to ten or more friends and acquaintances. Generally each of these individuals repeats the description of the bad experience to additional numbers of people. Each of these secondary contacts often repeats the description of the experience, as best recalled, to other individuals at a tertiary level from the direct experience. The spreading story of the one disgruntled consumer can easily reach a hundred or more potential consumers. Accordingly, it is recognized as better for providers that the customer complain to the management of the provider than to the customer's friends. This enables the provider to respond to the particular issue and to head off the spread of generally unfavorable comments regarding the provider.

There are a variety of mechanisms to meet the needs of providers to receive comments from consumers. One mechanism is to use independent market research firms to collect consumer comments as feedback of the performance of the provider. Many marketing research firms offer specialized programs in measurement of customer service. These research firms also consult, implement, and operate customer response systems on behalf client providers.

Obtaining customer comments for analysis, and reporting of same to the providers, takes many different forms. One of the most recognizable and widely used mechanisms is the use of comment cards, which are typically found at consumer service desks or at point-of-sales areas. Often these cards provide a simple check list of topics of interest to the retailer, such as customer service, product selection, and the like, with several descriptive adjectives or a ranking system using a range of numbers in order to rate the provider, its products, or its services, on a range from low to high, poor to excellent. For example, the ranking for each of the selected categories may be "poor", "less than satisfactory", "satisfactory", "excellent" which may also be reflective of a numerical range of 1 to 4 inclusive. The cards typically provide space for the consumer to write an individualized comment. The benefit of a comment card is capturing the near-spontaneous thoughts of the consumer, without reliance on face-to-face interaction between the consumer and a representative of the provider. Often, the comment cards are completed at the provider's location, so the reported information often is sent quickly back to management. Cards however have drawbacks which limit their use. The time and effort spent by the consumer to find response cards and to write comments often is a deterrent, which can lead to further dissatisfaction. The cards thus may be perceived by the consumer as such a sufficient obstacle that the comment is never delivered. Studies have shown that the rate of comment card usage can be as low as one one hundredth of one percent (of consumers entering the store) or lower. It is believed that consumers may also view the cards with skepticism because there is little assurance to the consumer that the information reported will be acted upon by the provider. Further, processing card information is laborious and it is cost intensive to collect, report and act on the information.

A computer kiosk having a touch-sensitive screen is a recent sophisticated alternate to comment cards. These devices benefit from being interactive and relatively easy to operate, but still require as much as 5–8 minutes of the consumer's time to register a comment. Typically, the consumer is directed through a menu of options depending on responses to previous questions. The screen attracts attention from passersby and not just those who feel strongly enough to volunteer opinions or comments. As with comment cards, computer kiosks have several drawbacks. Such kiosk stations are expensive and can cost $20,000 or more apiece, depending on level of sophistication. The questionnaire-style formats are relatively inflexible, in that questions are pre-determined and leave little opportunity or means for addressing or learning the specific concerns of the particular consumer. Questionnaires typically provide a list of subjects or topics and the consumer touches the screen at appropriate places in order to register general satisfaction or dissatisfaction with the performance of the provider for that subject or topic area. Further, some consumers may be reluctant to use new technology for registering comments or not want to commit the time required to operate the kiosk. Also, invalid data can be generated, in part due to the successful attention-attracting feature of the kiosk. Persons may enter responses just for the activity of using the system. Another important source of consumer comments is the customer service desk. The functions performed at the customer service desk primarily include merchandise return and exchange, packaging, and delivery of merchandise with the attendant responsibility of handling of customer complaints. A primary benefit of an active customer service desk is the personal interaction provided by the representative of the provider and the potential ability to address immediately the needs or perceptions of the consumer. However, customer service desks generally incur difficulty in operating as an effective recipient or processor of customer feedback. While the clerks may listen to the comments by consumers, and even take steps to respond to complaints, providers often lack formally documented procedures to record consumer concerns and suggestions and respond to such. Thus it may be difficult to identify provider-wide characteristics that need the attention and response of management. Also, due to locations of such service desks, and time constraints on both the consumer and clerks, customer service desks usually are ineffective in promoting casual feedback from consumers. Casual feedback often may be the most important information for providers because casual comments relate strongly to the near-simultaneous perception of the consumer which is being recorded in that environment. Also, a focus on comment feedback collection and processing is often overlooked due to the other critical functions the consumer service desk also provides.

Related to the collection and processing of consumer comments by a customer service desk are in-house customer help lines, personal interaction, and toll free consumer response telephone lines. An in-store help line connects the consumer with a representative of the provider at the point of purchase. Comments can be acted upon immediately. However, consumers often have to wait for attention once the call has been acknowledged by the representative, and the relative inaccessibility of help lines tends to hinder consumer response rates. Personal interaction either through the help line or direct in-store contact often has the benefit of resolving the customer concern at the time of occurrence. Personal interaction involves management or employees of the provider interacting with customers to ensure satisfaction. Often this is a function of the day-to-day activities of management and sales personnel of the provider. The benefits include the possibility of the immediate action to address the concerns of the consumer, the personal nature of the interaction and response, employee involvement in resolving consumer concerns, and the resulting potential to reinforce positive perceptions of the providers commitment to service and its responsiveness. Satisfactory personal interaction however, may be difficult to achieve. Responses satisfactory to the consumer depend upon the personal abilities and characteristics of the personnel handling the comments. Further, the representative may lack the authority to implement a solution to the consumers comment. Incorrect responses from improperly trained employees can be detrimental. Toll-free consumer lines are commonly perceived as a court of last resort which allow management to listen to local experiences. These toll-free calls also afford the consumer a non-confrontational venue to register complaints or comments. However, the toll-free numbers can deflect comments that should properly be handled by the local provider. Also, there is an inherent delay between the occurrence of which the consumer wishes to comment and the placing of the telephone call to register the comment, and the time necessary to register a comment is also a deterrent. These factors tend to reduce comments, except from the most determined.

Market research firms are capable of providing several comment-soliciting devices, including survey and questionnaires for analysis by consumers, focus groups, and mystery shoppers. The benefit of surveys are the ability to focus on precise aspects of the shopping experience. Surveys generally prompt consumers about shopping experiences. Surveys and questionnaire responses however are only as good as the particular questions involved. They often yield only predetermined multiple choice answers, similar to the computer kiosk or consumer comment card. A significant drawback is that surveys rarely capture spontaneous customer thoughts regarding services and products. Rather they tend to record and report an overall impression by the customer of the different facts of services and products. Similarly, focus groups generally consist of a small number of selected individuals who provide feedback on various market activities of concern to the provider. Focus groups can provide in-depth analysis of particular problems identified by the provider for investigation as well as providing a range of opinions obtained from the participants. Focus groups however fail to obtain spontaneous feedback. Other limits of the validity of the results obtained from focus groups include the forced solicitation of feedback, moderator biases, expense, time, and the artificial environment. Mystery shoppers can be provided either directly by the store or by a consulting organization. Mystery shopping however does not rely on specific customer reactions after reaching a threshold level so it is not biased towards collecting negative feedback. Further, mystery shopping provides only one particular individual's point of view, which may be limited and is potentially biased. Further, the individual involved may be desensitized to certain aspects of the shopping experience that actual customers might react to. The use of mystery shoppers is a relatively expensive and inefficient form of obtaining indirect customer feedback.

It is thus seen that a need exists for improving the collection, analysis, and reporting of consumer perceptions for management of providers to use in evaluating delivery of goods and services to consumers. It is to the provision of such that the present invention is primarily directed.

SUMMARY OF THE INVENTION

The present invention meets the need in the art by providing a consumer feedback apparatus for collecting, analyzing and reporting information on goods and services offered for sale to consumers by providers. The feedback apparatus comprises at least one recorder located at a provider of goods and services for a plurality of consumers and having storage means for holding a collection of discrete oral comments from at least one of said plurality of consumers regarding the goods and services. A time signal representative of a date and time is associated with each discrete oral comment. A communicator communicates the collection of discrete oral comments from the recorder to an analyzer which creates a normalized representation comprising a comment category, at least one descriptor, at least one dimension, an attitude, and the time signal, of each discrete oral comment. A reporter selects and reports normalized representations based on selected comment category, descriptor, dimension, attitude, and time signal. The report generated by the reporter provides information to the provider for responding to perceptions of consumers to its delivery of services and its goods.

In another aspect, the present invention provides a method of analyzing and reporting consumer perceptions regarding the services and goods offered by a provider. In the method, consumers selectively record on at least one recording station one or more oral comments about goods and services offered by a provider. A time signal representative of a date and time is associated with each discrete oral comment. The recorded oral comments and time signal are communicated from the recording station to an analyzer which creates a discrete normalized representation associated with each oral comment, including a comment category, at least one descriptor, at least one dimension, and an attitude. Selected normalized representations are then analyzed based on category, descriptor, dimension, attitude, and time signal, and a report is generated. The report generated by analyzing the selected normalized representations provides information for the provider to use in responding to consumer perceptions about the goods and services.

BRIEF DESCRIPTION OF THE DRAWINGS

FIG. 5 is a representative report of analyzed normalized comments.

DETAILED DESCRIPTION OF THE PREFERRED EMBODIMENTS

Figure 1:
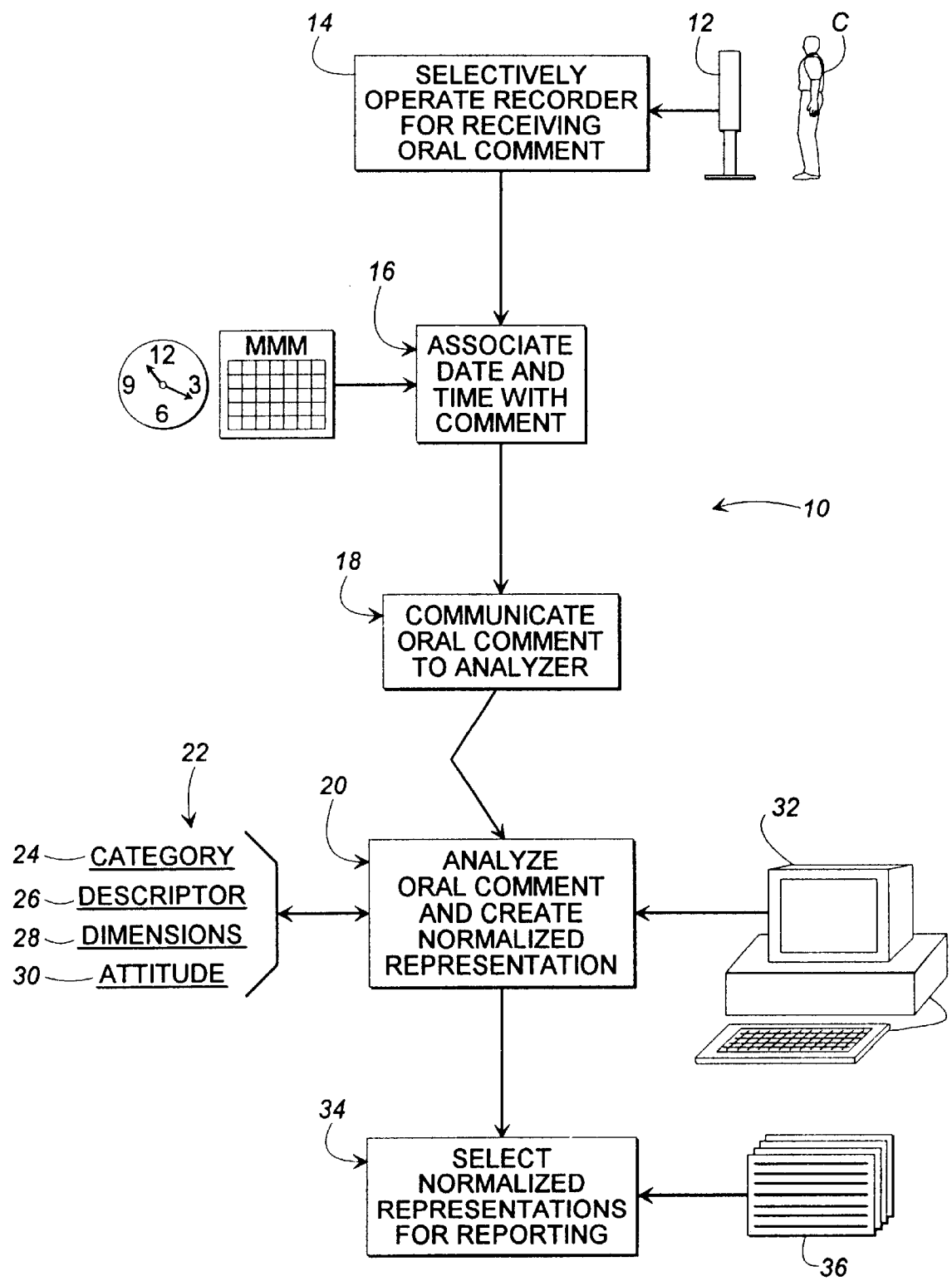
FIG. 1 is a schematic block diagram of the architecture of the consumer feedback apparatus of the present invention for collecting, analyzing and reporting consumer comments on goods and services offered for sale to consumers.

Referring now in more detail to the drawings in which like numerals indicate like parts throughout the several views, FIG. 1 illustrates in block diagram form a schematic of the architecture of the preferred embodiment of a consumer feedback apparatus 10 according to the present invention for collecting, analyzing, and reporting consumer comments on goods and services offered for sale to consumers by a provider. The provider locates a comment receiving station 12 in a convenient location for consumers to selectively operate 14 a recorder for receiving oral comments from the consumer C. After the comment is recorded by the consumer C, a date and time is associated 16 with the comment. The recording station 12 includes a storage device for recording a plurality of comments from one or more consumers C. In a preferred embodiment, the recording station includes a digital telephone message recording device. Such devices typically include a date and time "stamp" for recorded messages. In an alternate embodiment of the apparatus 10, the provider assigns to consumers a unique identifier 11. The consumer C enters the identification code selectively upon recording the comment 16 and upon making purchases. In this way, the provider tracks the comments and purchasing activity of the commentor. The collection of oral comments with the time stamp and consumer identification 11 are then communicated 18 to an analyzer for analysis and recording on a data base.

Each discrete oral comment by a consumer C is analyzed 20 and a normalized representation is created. Normalized representations include comment factors 22 comprising a comment category 24, at least one descriptor 26, at least one dimension 28, and an attitude 30. The comment factors 22 are used to convert the raw oral comments into useable information about goods and services i.e., for statistical analysis, whether the comment is a compliment, complaint, or idea for improvement as discussed below. The normalized representation is preferably stored on a database driven by a microprocessor computer 32 which includes a display screen, microprocessor, a keyboard, and a mouse-type entry device. Using a reporter 34, normalized representations are selected according to the category, descriptor, dimension, attitude, and time, for reporting 36 information to the provider for responding to perceptions of consumers about delivery and execution of services and goods and for monitoring levels of customer satisfaction according to a provider-defined index.

Figure 2:
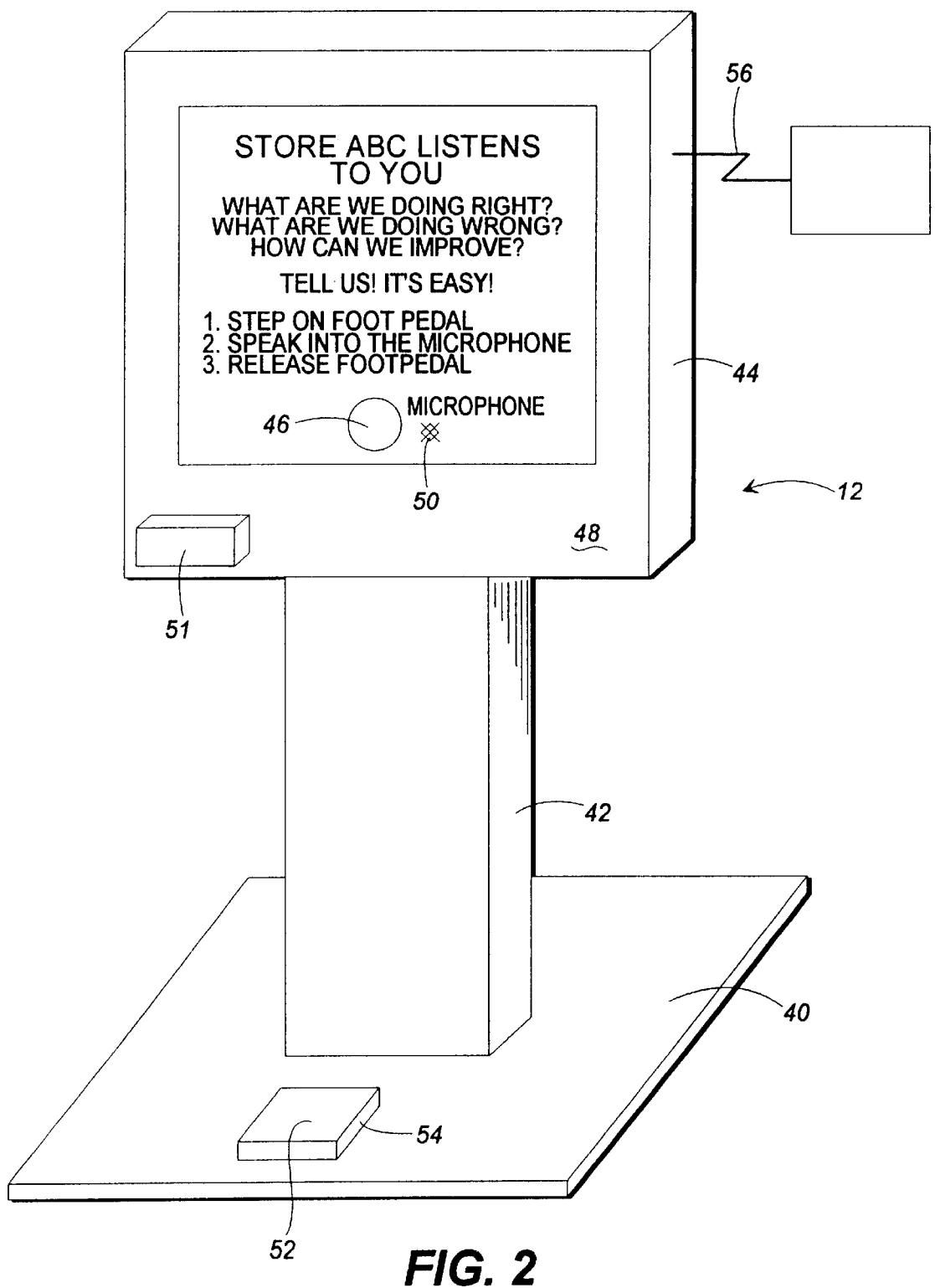
FIG. 2 is a perspective view of a recording station used in the consumer feedback apparatus of the present invention.

FIG. 2 is a perspective view of an illustration of the recording station 12. In the illustrated embodiment, the recording station 12 is a stand alone apparatus having a base 40 from which a pedestal 42 extends upwardly to support a housing 44 for the recording apparatus. A recorder is held in the housing 44 and a microphone 46 is attached to a front plate 48 of the housing 44. In the illustrated embodiment, a lamp 50 illuminates when the recorder is in operation. The front panel includes promotional information and instructions for use of the recorder. In the illustrated embodiment a foot pedal 52 is pivotally connected at one end 54 to the base 40. The foot pedal 52 is biased to an off-position and is movable to an actuated position, whereby the recorder in the housing 44 is operated. In an alternate embodiment (not illustrated), the recording station 12 mounts to a wall, with a push on/off switch affixed to the face of the recording. In the alternate embodiment in which consumer identification numbers 11 are tracked, the recording station 12 includes an entry device 51, such as a numeric keypad, a bar code scanner, or a magnetic swipe card reader. Using the keypad, the consumer enters the particular identification number. A bar code card with the consumer identification number is read by the bar code scanner. A card with the magnetically encoded identification number is passed through a reader. These devices activate the recorder for receiving comments.

In a preferred embodiment, the recorder connects by a telephone wire 56 to a telephone communications system, such as a PBX. In this manner, the recording station 12 is assigned its own telephone extension number. This facilitates dial capability for selectively communicating the recorded collection of oral comments from the recorder to the analyzer 20, as discussed below.

Figure 3:
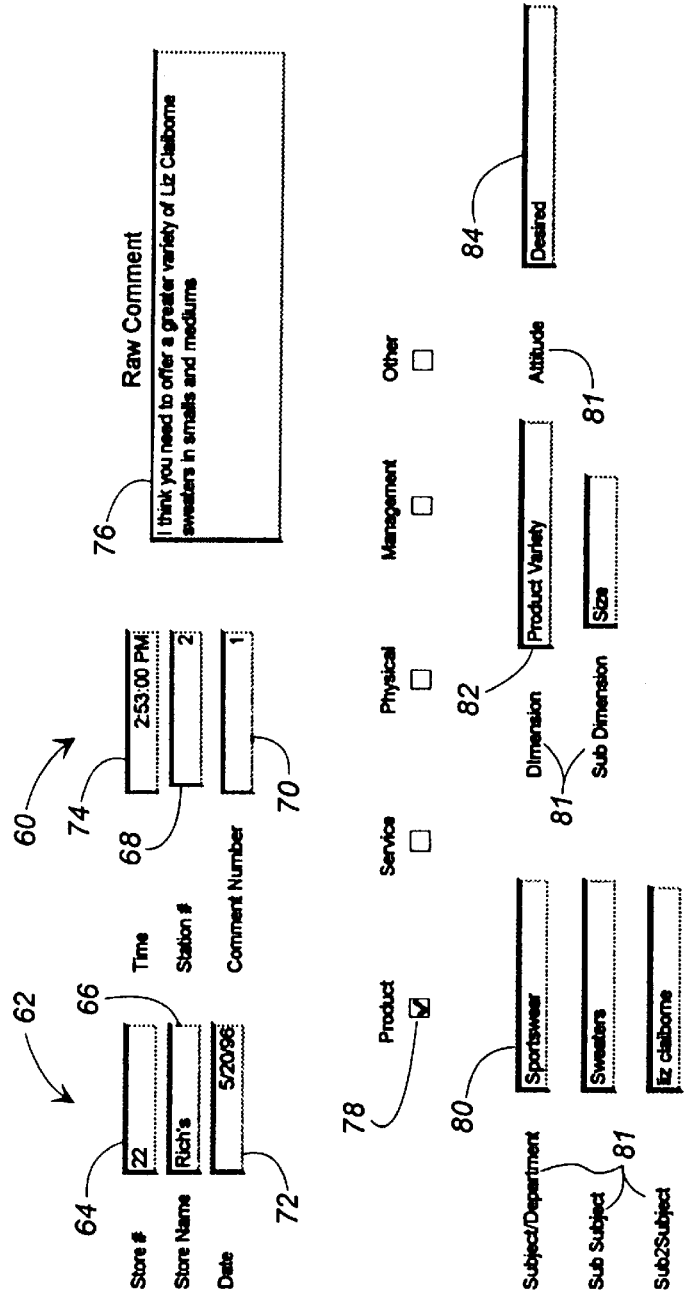
FIG. 3 is a interactive screen used for normalizing the raw consumer comment recording at the recording station in FIG. 2.

FIG. 3 is an interactive display screen used for normalizing the raw consumer comments recorded at the recording station illustrated in FIG. 2. According to the present invention, the raw comment is analyzed and converted to a normalized representation comprising a comment category, at least one descriptor, at least one dimension and an attitude. These characteristics facilitate handling and dealing with large amounts of non-uniform, subjective comments and impressions covering products, services, and facilities of the provider. These characteristics provide a hierarchial means for analyzing and reporting comments by consumers. The interactive screen 60 includes site identification information generally designated 62. In the illustrated embodiment, the site information 62 includes a store number 64, a store name 66, and a station number which identifies the particular recording station 12 at which the raw comment was recorded. For example, larger stores may use several recording stations 12 placed at several separate locations in the store. Each comment is assigned a sequential comment number 70 for purposes of tracking and correlating the normalized representation with the original raw comment. The screen also displays the date 72 and the time 74 that the raw comment 76 was recorded.

The normalized comment is then assigned to one of the comment categories 78 in a selectable field shown on the screen 60. In a preferred embodiment, a cursor on the microprocessor 32 is moved to the selected category and actuated to set the comment category. Table 1 below lists the comment categories in the illustrated embodiment for tracking consumer comments regarding goods and services provided by a retail department store.

TABLE 1

COMMENT CATEGORIES

| Category | Description |
|---|---|
| Product | Products sold by the store |
| Service | Services of the store, including sales persons, delivery persons, and customer service staff |
| Physical | Physical aspects of the store, including location, accessibility, appearance and the like |
| Management | Aspects of the management of the store including policies and procedures practiced by the store and its employees |
| Other | Miscellaneous comments not otherwise classified |

Each raw comment is also analyzed for determining at least one descriptor 80. The descriptors identify or name the subject matter of the comment. In the illustrated embodiment, a hierarchy of descriptors may be selected in order to more specifically identify the subject matter of the comment. Table 2 shows a list of descriptors for the comment categories described above for department stores, together with definitions of the descriptors. In the illustrated embodiment, the analyzed descriptors are typed into the appropriate descriptor field 80. In a preferred embodiment, the cursor of the microprocessor computer 32 is positioned on a field identifier 81, and the cursor is actuated by pressing a switch on the conventional mouse device attached to the computer. This causes a window to open on the screen 60, for displaying an alphabetical list of predetermined potential entries for the particular field. For example, the selectable departments for a department store include, but are not limited to, fashion, junior, linens, mens wear, toddlers, and so forth.

TABLE 2

DESCRIPTORS FOR COMMENT CATEGORIES

| CATEGORY/ DESCRIPTORS | DEFINITION | EXAMPLE |
|---|---|---|
| Product | | |
| Department | Sales department subject of the comment | Men's |
| Product | Generic name of the product subject of the comment | Suits |
| Provider | Name of the manufacturer or brand name of the product | Giovanni |
| Type | Description of the product | Blue, plaid, Wool, in "46 short" |
| Service | | |
| Department | Sales department subject of the comment | Men's |
| Type | Type of service subject of the comment | Sales service |
| Provider | Name of the person(s) or department subject of the comment | |
| Physical | | |
| Department | Name of department subject of the comment | Men's |

TABLE 2-continued

DESCRIPTORS FOR COMMENT CATEGORIES

| CATEGORY/ DESCRIPTORS | DEFINITION | EXAMPLE |
|---|---|---|
| Management | | |
| Department | Sales department subject of the comment | Men's |
| Provider | Name of person(s) subject of comment | |
| Policy | Rules which management has imposed | Returns |
| Other | | |
| Place | Place in store subject of the comment | Restrooms |
| Subject | Subject of the comment | Sinks |

Further, each comment 76 is characterized as to its dimension 82. The dimension characteristic identifies the problem or issue presented in the raw comment regarding the descriptor. The dimension characteristic relates to the quality, availability, price, knowledge, accessibility, appearance, or other attributes or aspects of a comment descriptor.

Table 3 below lists the dimension characteristics and definitions for the categories used in the illustrated embodiment of the present invention for a department store.

TABLE 3

EXAMPLES OF DIMENSION CHARACTERISTICS FOR COMMENT DESCRIPTORS WITHIN EACH CATEGORY

| Category/ Dimension | Definition |
|---|---|
| Product | |
| Quality | The condition or quality of the products |
| Availability | The availability of the product - too many, too few |
| Price | Price in terms of perceived value |
| Service | |
| Availability | Whether the service sought by the consumer was available |
| Courtesy | The behavior of the service provider |
| Knowledge | The responsiveness and ability of the provider to provide the service |
| Physical | |
| Accessibility | Buildings and facilities |
| Appearance | Comments regarding appearance, i.e., cleanliness |
| Management | |
| Availability | Whether a person is accessible |
| Knowledge | Responsiveness and ability of provider |
| Other | |
| Quality | Quality of product or service |
| Availability | Miscellaneous comments on availability of goods or services |

Finally, each comment 76 is assigned an attitude characteristic 84 which provides an indicator of the overall attitude expressed in the oral comment 76 by the consumer. For example, attitudes in the illustrated embodiment are "poor", "non-existent", "good", "desired", and "excellent", which describe a range of possible consumer attitudes towards the comment descriptors and dimensions described above.

In one embodiment of the present invention, the analysis of the raw comment 76 is conducted by a transcriber who has knowledge of the predetermined list of comment categories, descriptors, dimensions, and attitudes. In the embodiment illustrated in FIG. 3, raw comment 76 "I think you need to offer a greater variety of Liz Clairborne sweaters in smalls and mediums" is analyzed to a normalized representation "Consumer desires a variety of sizes in Liz Claiborne sweaters in sportswear". In alternate embodiments of the present invention, the categories 24, the descriptors 26, the dimensions 28, and the attitudes 30 are defined to relate to the particular provider involved, so that the information generated from the spontaneous comments of the consumers is tailored to the needs of the provider.

As discussed above, in a preferred embodiment, the transcriber uses a "mouse"-type entry device on the microprocessor computer 32 to select or highlight the characteristic being evaluated. Highlighting the characteristic brings up a window which displays the available predetermined list of terms for that characteristic. The analyzer selects the terms that best reflects the characteristic of the comment being normalized.

In an alternate embodiment, a digital representation of the raw oral comment is scanned by a semi-automatic analyzer implemented on the microprocessor. This analyzer includes a database of digital representations of the predetermined list of terms, or words associated with each characteristic in normalized representations. Each digitized term is compared with the digitized patterns of the raw comments. If the term is located within the digitized pattern of the raw comment, the term is entered into field for the appropriate normalized representation characteristic. The preliminary scan and analysis by comparing digital patterns reduces the time and work required of transcribers to analyze and create the normalized representations of the oral comments.

Figure 4:
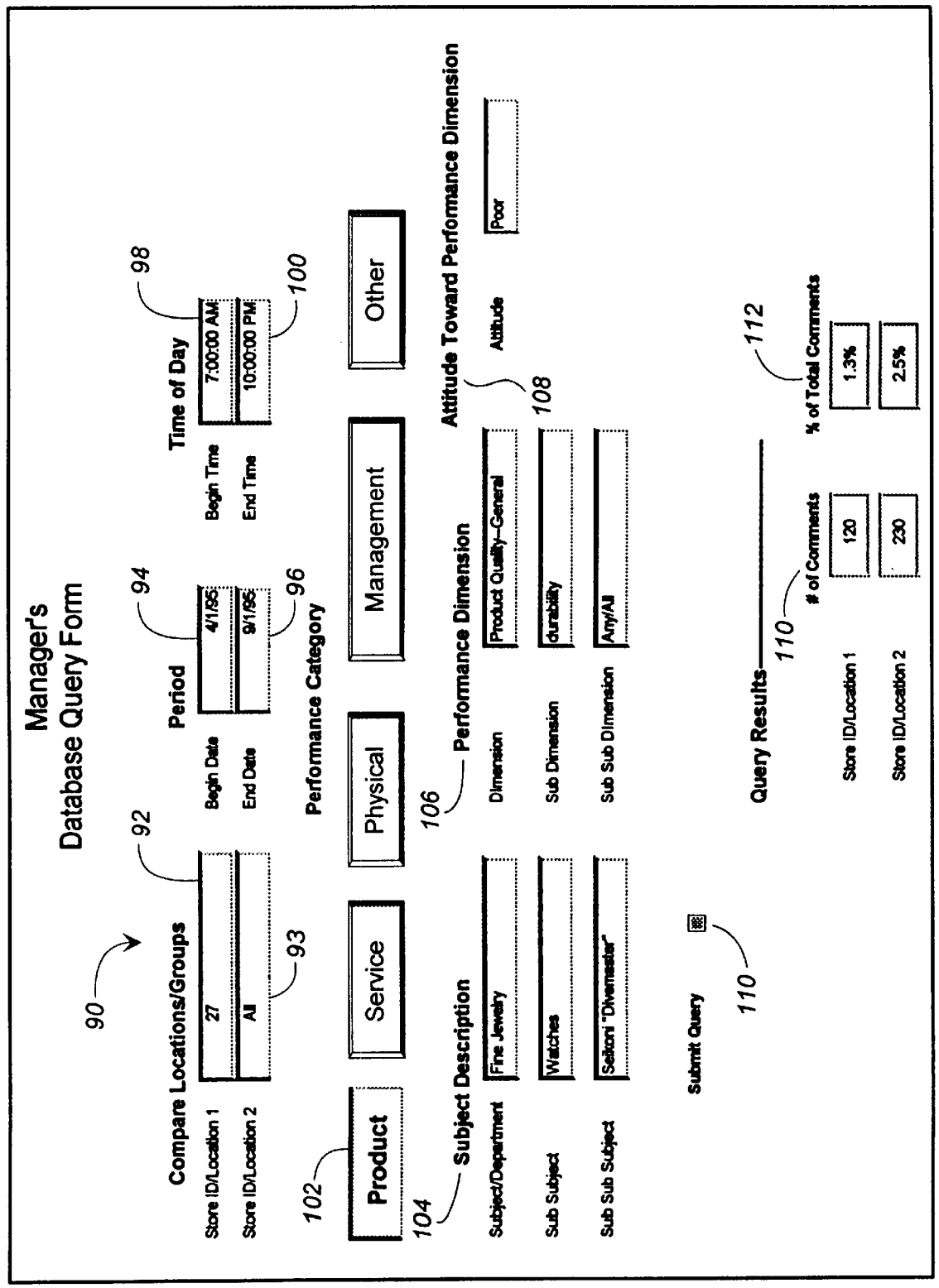
FIG. 4 is a computer screen used for selecting normalized comments for analysis.

The normalized comment shown on the screen 60 is thereafter recorded in a database accessible through the microprocessor computer 32. In a preferred embodiment, the database is a commercially available relational database, such as ACCESS brand database software provided by Microsoft, Inc. FIG. 4 illustrates a computer screen display 90 used for selecting normalized comments for analysis and reporting. The screen includes fields for entry of identifiers and defined terms by which the normalized comments can be selected and evaluated. The inquiry screen 90 includes a pair of fields 92 and 93 for identifying a store or group of stores for which reports are to be generated. A single store identifier is entered in field 92 to select those comments received from one particular store. Entering a second store identifier in field 93 enables the apparatus to select and compare, i.e., compare comments from one store to those from all stores, or compare one store with another, for the identifiers entered in 92 and 93. The period for which data is selected is set by entering dates in begin date field 94 and the end date field 96. If no date is entered in either field, all comments are selected. If only a begin date is entered in field 94, comments on and after that date are selected for reporting. If only an end data is entered in field 96, comments prior to that date are selected.

In the illustrated embodiment, comments from consumers are also tracked by time, and can be analyzed by entering a desired time in the beginning time field 98 and the end time field 100. As with the date fields 94 and 96, if no time is entered, all comments for the dates entered in fields 94 and 96 are selected. If only a beginning time is entered in field 98, comments on and after that time for the dates are selected for reporting. If only an end time is entered in field 100, only comments prior to that time for each date are selected.

The report selection screen 90 also includes comment category selection fields 102 for selecting the category of comments to be analyzed and reported on. The descriptor fields 104 provide for selecting the category descriptors for analysis. If no descriptor is entered, all descriptor comments are selected. Similarly, entries may be made in the dimension fields 106 to select only comments of the particular dimensions entered. If no entry is made, all dimensions of comments are selected for analysis and reporting. The type of attitude to be selected and analyzed is entered in an attitude field 108. If no attitude is entered, all attitudes will be selected and analyzed.

A query submission button 110 on the screen is activated, in order to transmit the entered selected fields to the selection and reporting apparatus. Upon completion of the selection and analysis, the query screen 90 reports the number of comments analyzed 110 and the percentage of comments involved 112. Conventional commands are used to direct tie apparatus 10 to print the analysis for review and action or to display the analysis on a computer video terminal. Although not illustrated, the embodiment of the apparatus 10 tracking comments by consumer includes an entry field for selecting the consumer identification number, for analysis and reporting.

Further, it is noted that the predetermined list of descriptions, dimensions, and attitudes can be displayed in one embodiment of the apparatus 10, by placing the cursor on the particular field for the characteristic and actuating the cursor conventionally by pressing a button on the mouse device of the computer 32.

FIG. 5 is a representative report illustrating information analyzed from selected normalized comments. The report includes a heading 120 which identifies the selected stores 122 and period 124. The number of comments and attitude for each category are listed (generally 126). The report includes summaries of the normalized comments and analysis (generally 128) as well as a reference number 130. The reference number 130 is selected for displaying the raw comments for which the particular summary of normalized comments is shown. For example, reference numeral 1 relates to the summary of normalized comment "Selkoni brand watches in the jewelry department have a poor image." The report shows that 5 raw comments were used to generate this summary. Further, when the report is displayed on a computer screen, the raw comments can be selectively displayed as at 132 in order to see the oral comments that were analyzed to become the normalized representations shown in the report. Based on the reports, providers can direct attention to resolving the problems identified by the spontaneous comments of consumers for the goods and services of the provider. In alternate embodiments, reports are available through Internet access to a home page maintained by the analyzer of the data. Audible presentation of original comments is provided over a telephone connection or through the Internet. Periodic routine reports are transmitted through E-mail, fax, or on computer disk.

The consumer feedback apparatus 10 of the present invention is used by locating at least one comment receiving station 12 at a provider of goods and services. In a preferred embodiment, the receiving station 12 is connected to a discrete telephone line for remote access to the recorder. A consumer approaches the recording station 12 and depresses the foot pedal 52. The pedal pivots from its biased off position to an actuated position, whereby the recorder in the housing 44 is operated. The consumer speaks into the microphone 46 which communicates signals representative of the spoken comment by the consumer to the recorder. In a preferred embodiment, the recording is made digitally. The date and time of the recording is associated with each comment. A lamp 50 illuminates to indicate that the recorder is in operation. In an alternate embodiment, the station 12 is activated by a hand-pushed button or a voice-actuated microphone.

Periodically, the collection of recorded comments is communicated 18 from the recorder 42 to the analyzer 20. The preferred embodiment, the analyzer is contained within a microprocessor computer 32 which accesses the recorder. The recorded oral comments are communicated to the microprocessor for storage and analysis. In reference to FIG. 3, each discrete consumer comment 76 is displayed on an interactive screen for creating a normalized representation of the comment. Based upon the analysis of the comment, the normalized representation is created, including the comment category 78, at least one descriptor 80, at least one dimension 82, and the attitude of the comment 84. The normalized comment is stored in a database accessible to the computer 32. Each oral comment contains the unique identifier 70 which correlates the comment with the normalized representation.

The normalized representations may then be analyzed and reported to the provider for responding to consumer perceptions regarding goods and services offered by the provider. In reference to FIG. 4, appropriate selection criteria are entered to the inquiry screen 90. The store or group of stores for which reports are to be generated are indicated in fields 92. The time period of comments to be analyzed is selected by entering the dates in the date fields 94 and 96. All of the normalized comments for the selected store or dates may be analyzed and reported. Similarly, categories, descriptors, dimensions, and attitudes may be selected for reporting in order to develop meaningful information for use by the provider responding to customer perceptions of the goods and services. The analyzed comments may selectively be displayed on a computer screen or printed 36.

In an alternate embodiment, the consumer feedback apparatus 10 uses a microphone which is linked directly to a microprocessor 32 for direct voice-to-text conversion and/or loading of the database at the time the consumer is making the comment. In another alternate embodiment, the consumer speaks directly by telephone to a transcriber which analyzes the comment as set forth above. Other devices can be used for entering comments by consumers, including a keyboard, touch screen, electronic pad for hand-written comments, and the like. Such embodiments may require a screen/display for visual feedback of the entry of the comment by the consumer.

The foregoing has disclosed an improved consumer feedback apparatus for collecting analyzing and reporting information on goods and services offered for sale to consumers. It should be understood that the above described embodiments generally illustrate principles of the invention in preferred forms. Many modifications, additions, and deletions, may, of course, may be made thereto without departure from the spirit and scope of the invention as set forth in the following claims.

What is claimed is:

1. A consumer feedback apparatus for collecting, analyzing, and reporting information on goods and services offered to a plurality of consumers by a provider of goods and services, comprising:

a kiosk stand for being located at a provider of goods and services to a plurality of consumers for collecting at least one oral comment from at least one of said plurality of consumers;

a touch-sensitive video display screen attached to said kiosk stand for being selectively operated by said at least one consumer;

a controller operatively engaged to the display screen for displaying operational instructions for collecting said oral comment from said at least one consumer;

a communicator for communicating said collected oral comment to an analyzer for creating a normalized representation of said collected oral comment, said normalized representation comprising a comment category, at least one descriptor, at least one dimension, an attitude, said analyzer remote from said kiosk stand; and a reporter for reporting said normalized representation in a usable format, said normalized representation selected based on at least one of said comment category, descriptor, dimension, and attitude, whereby said reporter provides usable information to the provider for responding to said oral comment.

2. The consumer feedback apparatus as recited in claim 1, further comprising a recorder for recording said oral comment collected from said at least one consumer.

3. The consumer feedback apparatus as recited in claim 1, further comprising means for associating automatically a time signal representative of a date and time with each discrete oral comment, which time signal is included with said normalized representations.

4. The consumer feedback apparatus as recited in claim 1, further comprising means for the provider remote from the analyzer to generate reports of selected normalized representations.

5. The consumer feedback apparatus as recited in claim 1, further comprising a computer-based storage means for holding said oral comment and said normalized representation.

6. The consumer feedback apparatus as recited in claim 5, further comprising means for the provider remote from the storage means to generate reports of selected normalized representations.

7. The consumer feedback apparatus as recited in claim 1, wherein the analyzer comprises a fuzzy-logic analyzer for interpreting each oral comment and creating the normalized representation.

8. The consumer feedback apparatus as recited in claim 1, further comprising means for associating each oral comment with the said one of the plurality of consumers.

9. The consumer feedback apparatus as recited in claim 8, wherein said recorder includes means for associating a unique code representative of the said one of the plurality of consumers making said oral comment, whereby comments by specific consumers can be tracked.

10. A method of collecting, analyzing, and reporting consumer feedback on goods and services offered for sale to consumers, comprising the steps of:

(a) collecting one or more oral comments by at least one of a plurality of consumers at a provider of goods and services, said oral comment received interactively by operation of at least one station with a touch-sensitive video display;

(b) communicating the collected oral comments from the station to an analyzer;

(c) creating a discrete normalized representation associated with each oral comment, said normalized representation comprising useable information from the oral comment about the goods and services subject of the oral comment;

(d) storing the discrete normalized representation;

(e) selecting normalized representations for analysis; and (f) generating a report of the selected normalized representations, whereby the report generated by analyzing the selected normalized representations provides useable information for the provider to use in responding to consumer perceptions about the goods and services.

11. The method of collecting, analyzing, and reporting consumer feedback as recited in claim 10, further comprising the step of recording the collected oral comment for communicating in step (c) at a predetermined time with other collected oral comments.

12. The method of collecting, analyzing, and reporting consumer feedback as recited in claim 10, wherein the analyzer creates useable information including a comment category, at least one descriptor, at least one dimension, and an attitude, representative of said discrete oral comment.

13. The method of collecting, analyzing, and reporting consumer feedback as recited in claim 12, wherein the selection is based on at least one of the comment category, descriptor, dimension, and attitude, of the normalized representations.

14. The method of collecting, analyzing, and reporting consumer feedback as recited in claim 12, wherein the steps (e) and (f) are performed by the provider remote from the storage of the discrete normalized representations.

15. A consumer feedback apparatus for collecting, analyzing, and reporting information on goods and services offered to a plurality of consumers by a provider of goods and services, comprising:

a kiosk stand for being located at a provider of goods and services to a plurality of consumers for collecting at least one oral comment from at least one of said plurality of consumers;

a touch-sensitive video display screen attached to said kiosk stand for being selectively operated by said at least one consumer;

a controller operatively engaged to the display screen for displaying operational instructions for collecting said oral comment from said at least one consumer;

a communicator for communicating said collected oral comment to a fuzzy-logic analyzer that interprets each oral comment and creates a normalized representation of said collected oral comment, said analyzer remote from said kiosk stand; and a reporter for reporting said normalized representation in a usable format, whereby said reporter provides usable information to the provider for responding to said oral comment.

16. The consumer feedback apparatus as recited in claim 15, further comprising a recorder for recording said oral comment collected from said at least one consumer.

17. The consumer feedback apparatus as recited in claim 15, further comprising means for associating automatically a time signal representative of a date and time with each discrete oral comment, which time signal is included with said normalized representations.

18. The consumer feedback apparatus as recited in claim 15, wherein said useable information comprises a comment category, at least one descriptor, at least one dimension, and an attitude, which said useable information is representative of the discrete oral comment; and wherein said reporter selects useable information for reporting based on at least one of said comment category, descriptor, dimension, and attitude.

19. The consumer feedback apparatus as recited in claim 15, further comprising a computer-based storage means for holding said oral comment and said normalized representation.

20. The consumer feedback apparatus as recited in claim 15, further comprising means for the provider remote from the analyzer to generate reports of selected normalized representations.

21. The consumer feedback apparatus as recited in claim 15, further comprising means for associating each oral comment with the said one of the plurality of consumers.

22. The consumer feedback apparatus as recited in claim 15, further comprising means for associating a unique code representative of the said one of the plurality of consumers making said oral comment, whereby comments by specific consumers can be tracked.

* * * * *